United States Patent
Abur et al.

(10) Patent No.: US 11,418,057 B2
(45) Date of Patent: Aug. 16, 2022

(54) COMPUTER-IMPLEMENTED METHODS AND SYSTEMS FOR AVOIDING DIVERGENCE IN MULTI-AREA POWER GRID STATE ESTIMATION

(71) Applicant: Northeastern University, Boston, MA (US)

(72) Inventors: Ali Abur, Brookline, MA (US); Pengxiang Ren, Boston, MA (US)

(73) Assignee: Northeastern University, Boston, MA (US)

( * ) Notice: Subject to any disclaimer, the term of this patent is extended or adjusted under 35 U.S.C. 154(b) by 137 days.

(21) Appl. No.: 17/119,248

(22) Filed: Dec. 11, 2020

(65) Prior Publication Data

US 2021/0184495 A1 Jun. 17, 2021

Related U.S. Application Data

(60) Provisional application No. 62/947,322, filed on Dec. 12, 2019.

(51) Int. Cl.
*H02J 13/00* (2006.01)
*H02J 3/00* (2006.01)

(52) U.S. Cl.
CPC ..... *H02J 13/00028* (2020.01); *H02J 2203/20* (2020.01)

(58) Field of Classification Search
None
See application file for complete search history.

(56) References Cited

U.S. PATENT DOCUMENTS

| 8,108,184 B2 * | 1/2012 | Fardanesh | G06F 30/3323 703/2 |
| 2013/0304266 A1 * | 11/2013 | Giannakis | G01R 21/133 700/286 |
| 2014/0372348 A1 * | 12/2014 | Lehmann | G06N 5/047 706/12 |

OTHER PUBLICATIONS

Abur et al., "Power Systems State Estimation: Theory and Implementation," New York: Marcel Dekker (2004).
Angelos et al., "Improving State Estimation With Real-Time External Equivalents," IEEE Transactions on Power Systems, 31(2):1289-1296 (2016).
Blanco et al., "An Efficient Robust Solution to the Two-Stage Stochastic Unit Commitment Problem," IEEE Transactions on Power Systems, 32(6): 4477-4488 (2017).
Chlebikova, "Approximating the Maximally Balanced Connected Partition Problem in graphs," Information Processing Letters, 60: 225-230 (1996).

(Continued)

*Primary Examiner* — Jared Fureman
*Assistant Examiner* — Aqeel H Bukhari
(74) *Attorney, Agent, or Firm* — Foley Hoag LLP; Dana M. Gordon; Rajesh Vallabh

(57) ABSTRACT

Divergence of state estimation solutions for multi-area power grids typically occurs due to a single anomaly in the measurement set or network model, yet will cause failure of the state estimator to provide the solution for the entire system. Disclosed herein are methods and systems that allow detection, identification and isolation of the anomaly during the state estimation solution so that a large percentage of the system states can still be estimated, while isolating the anomaly that is causing the divergence for the estimator.

20 Claims, 14 Drawing Sheets

(56) References Cited

OTHER PUBLICATIONS

Cutsem et al., "A Two-Level Static State Estimator for Electric Power Systems," IEEE Transactions on Power Apparatus and Systems, PAS—100(8):3722-3732 (1981).
Djuric et al., "Solving the Maximally Balanced Connected Partition Problem in Graphs by Using Genetic Algorithm," Computing and Informatics, 27: 341-354 (2008).
Fiduccia et al., "A Linear-Time Heuristic for Improving Network Partitions," General Electric Research and Development, 13(1): 175-181.
Ghahremani et al., "Local and Wide-Area PMU-Based Decentralized Dynamic State Estimation in Multi-Machine Power Systems," IEEE Transactions on Power Systems, 31(1):547-562 (2016).
Guo et al., "Hierarchical Multi-Area State Estimation via Sensitivity Function Exchanges," IEEE Transactions on Power Systems, 32(1): 442-453 (2017).
Gómez-Expósito et al., "A taxonomy of multi-area state estimation methods," Electric Power Systems Research, 81: 1060-1069 (2011).
Kamwa et al., "Fuzzy Partitioning of a Real Power System for Dynamic Vulnerability Assessment," IEEE Transactions on Power Systems, 24(3): 1356-1365 (2009).
Kang et al., "Distributed multi-area WLS state estimation integrating measurements weight update," IET Gener. Transm. Distrib., 11(10): 2552-2561 (2017).
Kekatos et al., "Distributed Robust Power System State Estimation," IEEE Transactions on Power Systems, 28(2):1617-1626 (2013).
Kernighan et al., "An Efficient Heuristic Procedure for Partitioning Graphs," The Bell System Technical Journal, 291-307 (1970).
Korres et al., "A Hybrid Method for Observability Analysis Using a Reduced Network Graph Theory," IEEE Transactions on Power Systems, 18(1): 295-304 (2003).
Lu et al., "Fully Decentralized Optimal Power Flow of Multi-Area Interconnected Power Systems Based on Distributed Interior Point Method," IEEE Transactions on Power Systems, 33(1): 901-910 (2018).
Minot et al., "A Distributed Gauss-Newton Method for Power System State Estimation," IEEE Transactions on Power Systems, 31(5): 3804-3815 (2016).
Osipov et al., "Adaptive Nonlinear Model Reduction for Fast Power System Simulation," IEEE Transactions on Power Systems, 33(6):6746-6754 (2018).
Pajic et al., "Power System State Estimation via Globally Convergent Methods," IEEE Transactions on Power Systems, 20(4):1683-1689 (2005).
Ren et al., "Modification of Boundary Zone Measurements to Avoid Spreading of Errors," Department of Electrical and Computer Engineering Northeastern University.
Ren et al., "Obtaining Partial Solutions for Divergent State Estimation Problems in Large Power Systems," 2018 IEEE International Symposium on Circuits and Systems (ISCAS) pp. 1-5 (2018).
Stoer et al., "A Simple Min-Cut Algorithm," Journal of the ACM, 44(4): 585-591 (1997).
Wu et al., "A Fast State Estimator for Systems Including Limited Number of PMUs," IEEE Transactions on Power Systems, 32(6):4329-4339 (2017).
Xie et al., "Fully Distributed State Estimation for Wide-Area Monitoring Systems," IEEE Transactions on Smart Grid, 3(3):1154-1169 (2012).
Yang et al., "Transition to a two-level linear state estimator part I: Architecture," IEEE Trans. Power Syst., 26(1):46-53 (2011).
Zhao et al., "A Marginal Equivalent Decomposition Method and Its Application to Multi-Area Optimal Power Flow Problems," IEEE Transactions on Power Systems, 29(1): 53-61 (2014).
Zhao et al., "Multiarea State Estimation Using Synchronized Phasor Measurements," IEEE Transactions on Power Systems, 20(2):611-617 (2005).
Zheng et al., "Distributed Robust Bilinear State Estimation for Power Systems with Nonlinear Measurements," IEEE Transactions on Power Systems, 32(1):499-509 (2017).

\* cited by examiner

TABLE I
COMPARISON OF AREA BOUNDARY CUT-SET OBJECTIVES

| Area | 1 | 6 | 15 | 18 | 51 |
|---|---|---|---|---|---|
| Obj. without ABME | 30 | 218 | 25 | 322 | 1128 |
| Obj. with ABME | 27 | 22 | 25 | 22 | 134 |

FIG. 10

TABLE II
COMPARISON OF METHODS ON AREA 3 OF IEEE 118 BUS SYSTEM WITH MEASUREMENT NOISE

| $w_{pp}$ | Estimation Objectives | | | | $N_{pp}$ | Time(s) |
|---|---|---|---|---|---|---|
| | $10^3$ | 1 | $10^4$ | | | |
| API | 1541.4 | 91.6 | 90.8 | | 8 | 0.0116 |
| CPID | 286.9 | 91.3 | 90.8 | | 4 | 0.0258 |
| CPIF | 90.9 | 91.1 | 90.8 | | 3 | 0.0301 |
| ABME* | 90.9 | 91.1 | 90.8 | | 0 | 0.0354 |

FIG. 11

TABLE III
COMPARISON OF METHODS ON AREA 3 OF IEEE 118 BUS SYSTEM
WITHOUT MEASUREMENT NOISE

| $\omega_p$ | Estimation Objectives | | | | $N_{pc}$ | Time(s) |
|---|---|---|---|---|---|---|
| | $10^3$ | 1 | $10^4$ | | | |
| API | 130.6 | 0.15 | $1.3 \times 10^4$ | | 8 | 0.0122 |
| CPID | $1.3 \times 10^4$ | $1.6 \times 10^4$ | $1.7 \times 10^5$ | | 4 | 0.0290 |
| CPIF | $1.4 \times 10^4$ | $1.4 \times 10^4$ | $1.4 \times 10^4$ | | 3 | 0.0287 |
| ABME* | $1.4 \times 10^4$ | $1.4 \times 10^4$ | $1.4 \times 10^4$ | | 0 | 0.0352 |

FIG. 12

TABLE IV
COMPARISON OF METHODS ON AREA 31 OF 17014 BUS SYSTEM WITHOUT
MEASUREMENT NOISE

| $\omega_p$ | Estimation Objectives | | | | $N_{pc}$ | Time(s) |
|---|---|---|---|---|---|---|
| | $10^2$ | $10^5$ | $10^6$ | | | |
| API | 5.2 | 0.0052 | $5.2 \times 10^5$ | | 202 | 0.2483 |
| CPID | 0.0947 | $9.4 \times 10^5$ | $9.2 \times 10^6$ | | 4 | 0.4956 |
| CPIF | $3.4 \times 10^6$ | $3.4 \times 10^6$ | $3.4 \times 10^6$ | | 2 | 1.2224 |
| ABME* | $3.4 \times 10^6$ | $3.4 \times 10^6$ | $3.4 \times 10^6$ | | 1 | 0.2679 |

FIG. 13

TABLE V
COMPARISON OF METHODS ON AREA 31 OF 17000 BUS SYSTEM WITHOUT
MEASUREMENT NOISE

| State Estimator | Average running time of 100 runs (s) |
|---|---|
| CntSE | 4.95 |
| 2LvSE-API | 4.74 |
| 2LvSE-CPID | 13.02 |
| 2LvSE-CPIF | 19.81 |
| 2LvSE-ABME | 10.71 |

FIG. 14

TABLE VI
GROSS ERROR IN REAL INJECTION AT BUS 54

| Bus | 1 | 41 | 58 | 65 | 109 |
|---|---|---|---|---|---|
| Area | 1 | 2 | 2 | 2 | 3 |
| Position | internal | internal | internal | boundary | internal |
| Actual Vm | 0.9550 | 0.9670 | 0.9590 | 1.0050 | 0.9670 |
| Actual Va | 0 | -3.9000 | 4.8400 | 16.9800 | 8.2600 |
| 2LvSE Vm | 0.9550 | NA | NA | 1.0050 | 0.9670 |
| 2LvSE Va | 0 | NA | NA | 16.9800 | 8.2600 |
| Percentage of buses that 2LvSE provides solutions | | | | | 81.0 |

FIG. 15

TABLE VII
TOPOLOGY ERROR OF ERRONEOUS BREAKER STATUS AT BUS 110

| Bus | 38 | 58 | 70 | 97 | 110 |
|---|---|---|---|---|---|
| Area | 1 | 2 | 3 | 3 | 3 |
| Position | boundary | internal | boundary | internal | internal |
| Actual Vm | 0.9620 | 0.9590 | 0.9840 | 1.0100 | 0.9670 |
| Actual Va | 6.2400 | 4.8400 | 11.7600 | 17.0700 | 8.2600 |
| TR Vm | 0.9781 | 0.9767 | 0.9776 | 0.9814 | 0.9766 |
| TR Va | 34.1931 | 23.5210 | 63.9047 | 93.7967 | 45.6368 |
| 2LvSE Vm | 0.9620 | 0.9590 | 0.9840 | NA | NA |
| 2LvSE Va | 6.2400 | 4.8400 | 11.7600 | NA | NA |
| Percentage of buses that 2LvSE provides solutions | | | | | 64.2 |

FIG. 16

TABLE VIII
GROSS ERROR IN REAL POWER FLOW ON BRANCH 9408 – 8547

| Bus | 8500 | 8547 | 9230 | 9299 | 12082 |
|---|---|---|---|---|---|
| Area | 19 | 20 | 22 | 22 | 36 |
| Position | internal | internal | internal | boundary | boundary |
| Actual Vm | 0.989 | 1.020 | 1.020 | 1.010 | 1.020 |
| Actual Va | -0.41 | 17.10 | 1.77 | 0.738 | 44.80 |
| 2LvSE Vm | 0.989 | NA | NA | 1.010 | 1.020 |
| 2LvSE Va | -0.41 | NA | NA | 0.738 | 44.80 |
| Percentage of buses that 2LvSE provides solutions | | | | | 98.8 |

FIG. 17

TABLE IX
TOPOLOGY ERROR: OUTAGE OF LINE 14591 – 14621

| Bus | 8500 | 14559 | 14612 | 14621 | 15054 |
|---|---|---|---|---|---|
| Area | 19 | 43 | 43 | 43 | 44 |
| Position | internal | internal | boundary | internal | internal |
| Actual Vm | 0.989 | 1.080 | 1.049 | 1.042 | 1.010 |
| Actual Va | -0.41 | 49.43 | 44.90 | 48.27 | 81.41 |
| 2LvSE Vm | 0.989 | NA | 1.049 | NA | 1.010 |
| 2LvSE Va | -0.41 | NA | 44.90 | NA | 81.41 |
| Percentage of buses that 2LvSE provides solutions | | | | | 99.1 |

FIG. 18

COMPUTER-IMPLEMENTED METHODS AND SYSTEMS FOR AVOIDING DIVERGENCE IN MULTI-AREA POWER GRID STATE ESTIMATION

CROSS REFERENCE TO RELATED APPLICATION

This application claims priority from U.S. Provisional Patent Application No. 62/947,322 filed on Dec. 12, 2019 entitled NON-DIVERGENT STATE ESTIMATOR FOR LARGE-SCALE POWER SYSTEMS, which is hereby incorporated by reference.

GOVERNMENT SUPPORT

This invention was made with government support under Grant No. EEC-1041877 awarded by the National Science Foundation. The government has certain rights in the invention.

BACKGROUND

The present application relates generally to multi-area power grids and, more particularly, to divergence of the state estimation solution for such power grids. Divergence typically occurs due to a single anomaly in the measurement set or network model, yet will cause failure of the state estimator to provide the solution for the entire system. Various embodiments disclosed herein relate to techniques for detection, identification, and isolation of the anomaly during the state estimation solution so that a large percentage of the system states can still be estimated, while isolating the anomaly that is causing the divergence for the estimator.

BRIEF SUMMARY OF THE DISCLOSURE

A computer-implemented method in accordance with one or more embodiments is provided for state estimation for a multi-area power grid. The method includes the steps of: (a) partitioning the multi-area power grid into a plurality of interconnected areas based on a given set of partitioning criteria, each of said areas having one or more substations; (b) using an individual area state estimator for each of said plurality of areas to attempt to independently calculate an individual area solution of a state of each area based on measurement data received from sensors in the one or more substations in the area; (c) when an individual area solution cannot be obtained for a given area because the individual area state estimator for the given area fails to converge, partitioning the given area into a plurality of interconnected sub-areas based on a given set of criteria, and attempting to independently calculate an individual area solution of a state of each sub-area based on measurement data received from sensors in the one or more substations in the sub-area, and isolating any sub-area for which an individual area solution cannot be obtained; (d) combining the individual area solutions for said plurality of areas obtained in (b) and the plurality of sub-areas obtained in (c) to determine at least a partial solution for a state of the multi-area power grid; and (e) outputting the solution for a state of the multi-area power grid.

A computer system in accordance with one or more embodiments includes at least one processor; memory associated with the at least one processor; and a program supported in the memory for state estimation for a multi-area power grid. The program contains a plurality of instructions which, when executed by the at least one processor, cause the at least one processor to: (a) partition the multi-area power grid into a plurality of interconnected areas based on a given set of partitioning criteria, each of said areas having one or more substations; (b) use an individual area state estimator for each of said plurality of areas to attempt to independently calculate an individual area solution of a state of each area based on measurement data received from sensors in the one or more substations in the area; (c) when an individual area solution cannot be obtained for a given area because the individual area state estimator for the given area fails to converge, partition the given area into a plurality of interconnected sub-areas based on a given set of criteria, and attempt to independently calculate an individual area solution of a state of each sub-area based on measurement data received from sensors in the one or more substations in the sub-area, and isolate any sub-area for which an individual area solution cannot be obtained; (d) combine the individual area solutions for said plurality of areas obtained in (b) and the plurality of sub-areas obtained in (c) to determine at least a partial solution for a state of the multi-area power grid; and (e) output the solution for a state of the multi-area power grid.

A computer program product residing on a non-transitory computer readable medium in accordance with one or more further embodiments has a plurality of instructions stored thereon for state estimation for a multi-area power grid. The instructions when executed by a computer processor, cause that computer processor to: (a) partition the multi-area power grid into a plurality of interconnected areas based on a given set of partitioning criteria, each of the areas having one or more substations; (b) use an individual area state estimator for each of the plurality of areas to attempt to independently calculate an individual area solution of a state of each area based on measurement data received from sensors in the one or more substations in the area; (c) when an individual area solution cannot be obtained for a given area because the individual area state estimator for the given area fails to converge, partition the given area into a plurality of interconnected sub-areas based on a given set of criteria, and attempt to independently calculate an individual area solution of a state of each sub-area based on measurement data received from sensors in the one or more substations in the sub-area, and isolate any sub-area for which an individual area solution cannot be obtained; (d) combine the individual area solutions for the plurality of areas obtained in (b) and the plurality of sub-areas obtained in (c) to determine at least a partial solution for a state of the multi-area power grid; and (e) output the solution for a state of the multi-area power grid.

BRIEF DESCRIPTION OF THE DRAWINGS

FIGS. 10-18 show Tables I-IX, respectively.

DETAILED DESCRIPTION

I. Introduction

Figure 1:
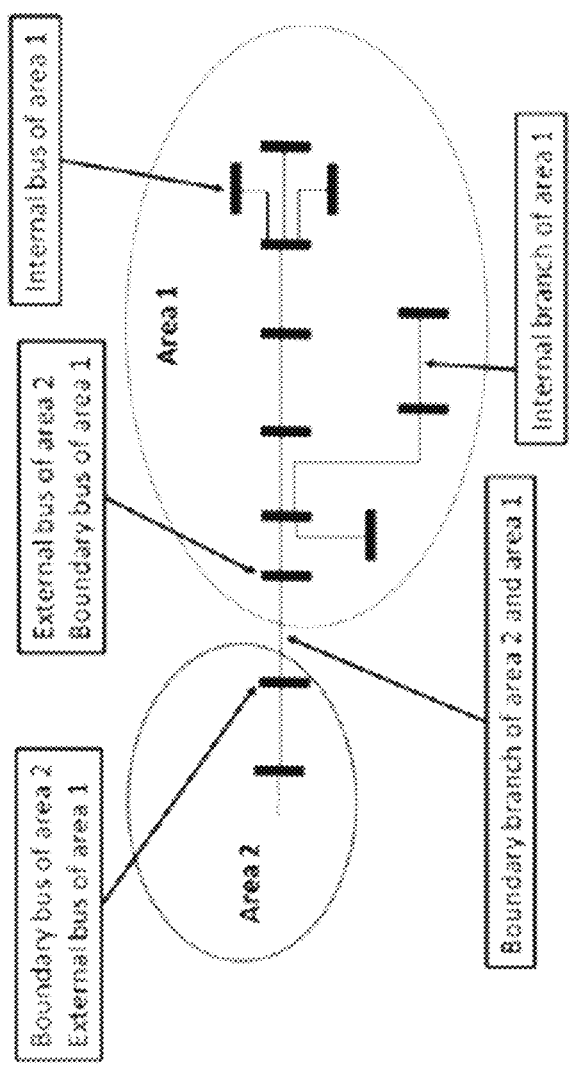
FIG. 1 illustrates one example of bus assignments for power grid areas in accordance with one or more embodiments.

Increased penetration of renewable sources coupled with connection of unconventional loads to power grids force the operators to model and monitor the grid more closely and reliably. Large scale system state estimators (SE) have been successfully implemented and used by numerous control center operators for this purpose. However, even the most reliable estimators are vulnerable to occasional divergence due to errors in network model, parameters, or measurements. When the state estimator fails to converge it is usually due to such an error in a specific part of the grid, yet due to the integrated formulation of the state estimation problem, it will cause divergence of the overall state estimator. Hence, in a multi-area large scale power grid, the system-wide state estimator's performance is limited by the area with the least reliable and accurate model and measurements in the overall system. The present application relates to such cases when SE fails to converge because a certain area experiences convergence issues, which may be due to bad data, loss of measurements, topology errors, network parameter errors, and extreme operation conditions etc.

From the point view of the root cause of divergence, the Gauss-Newton algorithm cannot guarantee the convergence of the iterates while solving least squares problem. The convergence may fail when the starting point is far away from the 'globally optimal' solution, which is severely biased by very large residuals. In [1], the authors introduce the line search method and the trust region (restricted step) method in order to improve the convergence. The trust region method is robust in sense of finding the global minimum of the objectives. However, its excessive computational burden and bias of the estimated states limit its practical implementation.

Some other methods such as least absolute value (LAV) and least median squares (LMS) are robust regression methods that are not sensitive to outliers in the measurement set. However, due to high nonlinearity and potential inaccuracy of the measurement model for a large scale system, it is not guaranteed to filter out all errors, find the global minimum and obtain converged solutions.

Another approach is disclsosed herein that is based on the earlier work on multi-area two-level state estimator (2LvSE) [2], [3]. This method involves a two stage solution where the first stage obtains individual area solutions, followed by a coordination stage where these solutions are combined and synchronized by a central processor. The purpose of the second stage is to synchronize individual area reference angles as well as detect and remove any errors that were missed by individual area solvers.

The first stage of the 2LvSE algorithm, which identifies and isolates the area containing the root cause of divergence, is presented briefly in [4]. The present application describes the methodology, its implementation and associated challenges, along with large scale system simulation results. In this approach, the system is strategically partitioned into areas according to some predefined criteria. Then, each of the partitioned area SE solutions are independently attempted to be obtained. If any of the area SEs fail to converge, these areas are removed from the network model and the solutions from all other areas are reconciled and synchronized to reach a partial solution for the overall system. Efficient implementation of this approach involves some challenges related to strategic partitioning while maintaining area observability, discussed in further detail below. A novel approach is disclosed for area partitioning, avoiding boundary observability issues, and a computationally efficient implementation of the method on a very large scale power grid.

The rest of the application is arranged as follows: Section II reviews the nomenclature and systematic procedure of two-level state estimator. In Section III, the methods to partition a whole power system into several areas are proposed. After such partitioning, network observability maybe violated because of topology change and measurement reallocation. This problem is discussed and proper solutions are given in Section IV. Simulation results based on several systems are reported in Section V, followed by conclusions.

II. Review of Two Level State Estimation

A. Brief Review of Multi-Area State Estimation

Multi-area state estimation (MASE) has been described in publications since 1970s. MASE has drawn the attention of researchers [5] first mainly to address the issues of computational efficiency. An excellent review of various methods proposed in the literature is given in [6]. Methods proposed so far for MASE can be differentiated with respect to the following implementation categories:

Area boundary definitions: non-overlapping, tie-line overlapping and extended overlapping.

Computing architecture: hierarchical and decentralized.

Coordination: at the SE level, at the iteration level and hybrid.

Synchronization: with or without using phasor measurement units (PMUs).

Solution methodology.

Recently, MASE was investigated further by several re-searchers [7]-[16]. Most of them assume availability of PMU measurements to synchronize the results of each area [7], [9], [10], [12]-[14]. The local state estimation obtained at the first level is coordinated at a higher level via synchronized phasor measurements. The two-level process proposed in [7] removes the bad data and topology errors, at the substation level. [9] introduces the Huber's M-estimator in a decentralized manner to do bad data processing. Authors of [10] utilized steady-state external equivalents in conjunction with phasor measurements to process the state of large multi-area systems. A three-stage SE method and a linear estimator are developed in [12] to improve computational efficiency and maintain accuracy with multiple bad data. Authors of [13] extend the bilinear state estimator to handle multi-area power systems with minimum data exchange among neighboring areas. In [14], a re-weighted least squares framework is implemented for MASE. In [15], a matrix splitting technique is used to carry out the matrix inversion needed for calculating the Gauss-Newton step in a distributed fashion. In [16], a hierarchical MASE method is proposed by exchanging the sensitivity functions of local state estimator rather than boundary measurements.

In this application, the following scenario is considered:
A large scale system state estimator diverges;
All the system topology and measurement information are available at the control center; and
No PMU measurements are available.

In order to handle such scenarios, a two-level state estimator is developed and implemented as described below.

B. State Estimation Formulation

Before presenting the two-level state estimator, consider the typical measurement equation:

$$z = h(x) + e \quad (1)$$

where z is the known measurement vector, x is the state vector to be estimated, usually consisted of bus voltage magnitude and phase angle. h is the vector of linear or nonlinear functions and e is the vector of measurement error.

The commonly used weighted least squares (WLS) estimator will minimize an objective function given by $$J = \sum_{i=1}^{m} W_i r_i^2, \quad (2)$$

Where $r_i = z_i - h_i(\hat{x})$ is the residual for measurement i, $\hat{x}$ is the estimated state vector, $W_i$ is the weight, and m is the number of measurements.

C. Two-Level State Estimator and Associated Nomenclature

The specific case of the two-level state estimator falls under those methods that use a hierarchical computational frame-work, overlapping tie-lines and strictly SCADA measurements.

A brief review of the approach is given here in order to describe the proposed extension more clearly using consistent notation. It is assumed that the power grid has N buses and composed of n areas. The areas are defined in such a way that they are connected by tie-lines, which connect buses belonging to different areas. Thus, branches are either inside an area or connecting two areas. The set of buses in area i are designated by set $S_i$ and union of all such sets will constitute the set of all system buses S. Those buses in area i with incident tie-lines form the set of boundary buses of area i, i.e., the boundary tier of area i, denoted by $S_i^b$. The remaining buses in area i will form the set of internal buses, denoted by Sim'. The union of all boundary buses is denoted by $S^b$. Each area has a designated set of external buses $S_i^{ext}$; which are the remote end buses of tie-lines incident to the area, i.e., the external tier of area i. The relationship between various sets defined above is given in compact form below:

$$S = S_1 \cup S_2 \cup \ldots \cup S_n$$

$$S_i \cap S_j = \emptyset \text{ for all } j \neq i \text{ and } j = 1 \ldots n$$

$$S_i = S_i^b \cup S_i^{int}$$

$$S^b = S_1^b \cup S_2^b \cup \ldots \cup S_n^b = S_1^{ext} \cup S_2^{ext} \cup \ldots \cup S_n^{ext}.$$

An example of bus assignments is shown in the FIG. 1.

The above bus assignments can be used to define the state vectors $x_i^b$, $x_i^{int}$, $x_i^{ext}$ corresponding to the buses in sets $S_i^b$, $S_i^{int}$, and $S_i^{ext}$ respectively. Area i composite state vector $x_i$ with dimension $n_i$ is defined as:

$$x = [(x_i^b)^T, (x_i^{int})^T, (x_i^{ext})^T]^T.$$

As evident from the above definitions, some states corresponding to the boundary buses are estimated twice by the two neighboring area estimators during the first level state estimation.

The individual area state estimates are consolidated in the second level estimation and all bad data associated with the boundary measurements are identified and corrected. The states, which are to be estimated in the second level, are:

$$x_s = [(x_1^{into})^T, (x_1^b)^T, \ldots, (x_n^{into})^T, (x_n^b)^T, u_2, \ldots, u_n]^T$$

where $x_i^b$ is the boundary bus states of $i^{th}$ area, $x_i^{into}$ indicates the immediate internal bus neighbors of boundary buses in area i. $u_i$ is the phase angle of the slack bus of the $i^{th}$ area with respect to the reference bus of area area 1, which is arbitrarily chosen as the reference with $u_1 = 0$.

Figure 2:
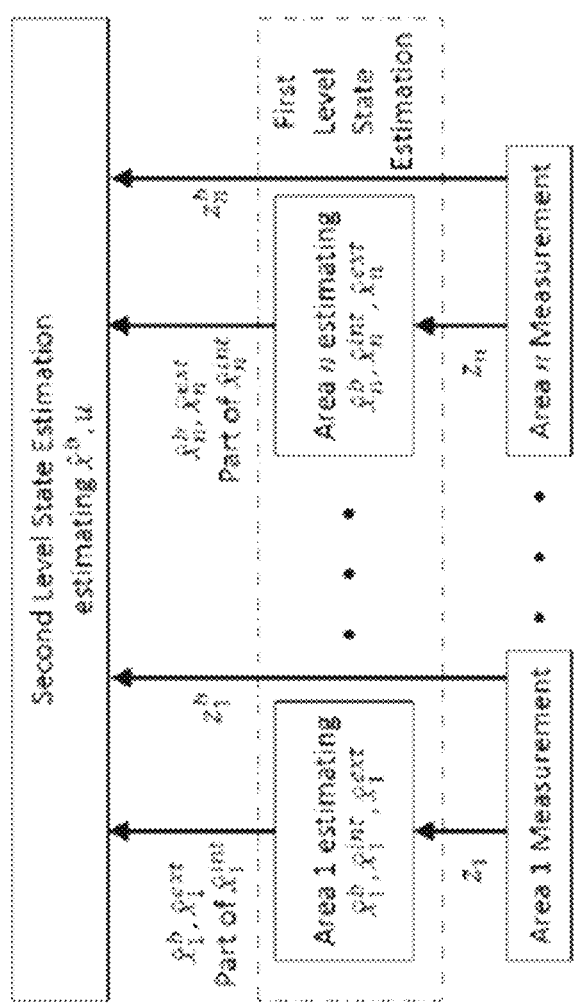
FIG. 2 is a schematic flow diagram of an exemplary two-level state estimator in accordance with one or more embodiments.

A compact layout of the two-level state estimator is shown in FIG. 2. In the first level, each area will have its own state estimator, which will process locally acquired measurements along with any available boundary measurements. Part of the estimated states from each area as well as its own boundary measurements are telemetered to the control center where the second level estimator is executed. The estimates from the first level correspond to boundary buses, their immediate internal bus neighbors, and part or all of the external buses, which are discussed later in Section III and Section IV. The second level state estimator is responsible for the estimation of the coordination vector including states of boundary buses and area reference angles.

Given the vulnerability of WLS estimator to bad data, the Largest Normalized Residual Test [17] is employed both in the first and second level state estimation to detect and remove bad data. In those cases where the first level estimator misses the bad data due to reduced redundancy around the boundaries, these bad data are identified and corrected by the coordinating second level estimator. In the extreme cases with errors in a given area prohibiting convergence of the area estimator, this area is excluded from the integrated solution, which will include the consolidated estimates from all other areas with converged solutions.

III. Area Partitioning Technique

A. Connectivity of the System

Consider a power network and its associated graph defined by G=(V, E), with V buses and E branches. Partitioning of G into smaller graphs with certain desired properties is a problem well investigated in the literature of NP-hard problems. In the field of power systems, partitioning techniques are widely applied, some examples of which are given below:
multi-stage state estimation [9], [16];
decentralized optimal power flow [18], [19];
unit commitment [20];
parallel system restoration and back protection;
dynamic behavior analysis and model reduction [21], [22].

Among many approaches proposed for graph partitioning such as the Kernighan-Lin algorithm [23], Fiduccia-Mattheyses algorithm [24], methods solving Balanced Connected Partition (BCP) problem such as [25], [26], not all lend themselves to power grid problems. The first two algorithms do not guarantee every partitioned area to be connected, while the BCP problem aiming to equalize the sum of vertices' weights for each partition, is NP-complete, hence can not be solved in polynomial time. Thus, these methods are not computationally practical for partitioning large scale power grids.

Most large scale power grids already have well defined control areas, which can be used as a starting point for partitioning the system. The main problem with the existing membership of buses to areas is that due to geometrical, electrical, or security reasons, buses belonging to the same areas are not always interconnected.

In order to distinguish between existing partitions and the modified ones for the multi-area state estimation, they are referred as 'zones' and 'areas' respectively in the rest of the paper. The zones may have the following properties:

a zone may consist of several disconnected subgraphs;
there may be some isolated small islands;
some zones contain a very small number of buses.

If a zone contains a very small number of buses, then a large portion of its buses may become boundary buses, and the corresponding injection measurements can no longer be used, which largely reduced the estimation accuracy. Thus, a minimum limit on the acceptable size for a zone is established. This limit, denoted as NATH is chosen as 20 based on the systems worked on during this study.

Since individual area state estimators can only solve areas without physical islands, some of the zones need to be expanded, shrunk or even eliminated. Therefore, an area modification procedure with the following objectives needs to be developed:

ensure network connectivity of every modified area by merging buses of small subgraphs into nearby zones, eliminate the zones that contain less than NATH buses;
reduce the number of buses that need to be assigned;
reduce the number of buses in larger zones and increase the number of buses in smaller zones.

B. Area Modification Algorithm

The following procedure is used to modify zones and create areas with the above desired properties:

Step 1: Identify the existing zones by the set of buses belonging to each zone for all n zones $Z_1, Z_2, \ldots, Z_n$.

Step 2: Order the zones starting with the largest as $A_1, A_2, \ldots, A_n$. Initialize area index k=1 and connectivity index for each area as $c_1=c_2=\ldots=c_n=0$.

Step 3: For area k, identify all disconnected subgraphs as follows:

3.1 begin at any arbitrary bus of the graph;
3.2 proceed from that bus using breadth-first search, counting all nodes reached;
3.3 once the graph is fully traversed, if the bus count is equal to the number of buses of the graph, declare the graph is connected. Otherwise store the counted buses as a subgraph and then select a bus that has not been counted and go back to the step 3.2.

If the area is connected, let $c_k=1$ and go to Step 7. Else go to Step 4.

Step 4: For $n_k$ subgraphs in area $A_k$, sort by their sizes in decreasing order and denote as $A_{k,1}, A_{k,2}, \ldots, A_k, n_k$. If the size of $A_{k,1}$ is larger than an area size threshold $N_{ATH}$, then let subgraph index j=2 (this indicates that all subgraphs need to be processed except $A_{k,1}$); otherwise let j=1 and ck=1.

Step 5: Obtain all the buses that directly connect but not belong to the buses in the subgraph $A_{k,j}$. These neighboring buses belong to other areas. Select the area that contains the most number of these buses and merge subgraph $A_{k,j}$ to this area.

Step 6: If $j<n_k$, let j=j+1 and go back to Step 5. Else go to Step 7.

Step 7: If k<n, let k=k+1 and go back to Step 3. Else go to Step 8.

Step 8: If all areas are connected, i.e., $\Sigma_{i=1}^{n} c_i=n$ go to Step 9. Otherwise go back to Step 2.

Step 9: Store the resulting areas and stop.

For a very small area, the change of its boundary topology is relatively significant, and may consequently influence state estimation results much. Therefore, a suitable limit for the area size is introduced in Step 4 to control the size of smallest area.

In Step 5, bus numbers of external neighbors and their corresponding areas are recorded for the processed subgraph. These areas are the designated candidates for merging that subgraph, which are merged with the area having the most connections to the subgraph. This scheme ensures that each assignment yields the least change in local topology, i.e., least interconnections between modified areas.

IV. Area Observability Analysis

Figure 3:
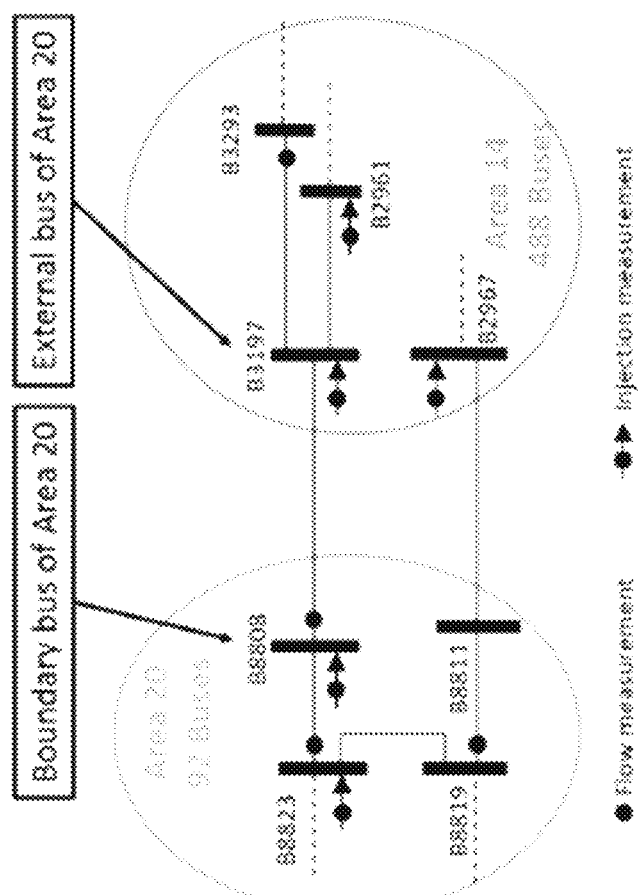
FIG. 3 illustrates one example of boundary topology and measurements in accordance with one or more embodiments.

Prior to the execution of individual area state estimation solutions, network observability needs to be checked for each area. Given a set of measurements and their locations, the network observability analysis will determine if a unique estimate can be found for the system state [17]. When a network is decomposed into several areas, the boundary information of each area should be defined. For the first level state estimation as discussed above, the external buses of an area are considered. Power injections incident to these buses can no longer be used and have to be removed, which may lead to loss of observability. FIG. 3 illustrates an example of boundary topology and measurements. Considering area 20 in FIG. 3 as an example, the states of buses in area 20, along with the external buses 3197 and 2967, are estimated by first level state estimation of area 20. The injections at bus 3197 and 2967 however are unusable and have to be removed. This causes branch 8811 to 2967 to become an unobservable branch. Since the entire system is observable, this loss of observability for individual areas after partitioning is mainly due to the removal of injections at external buses.

There are several methods to mitigate this problem, which are introduced and discussed in this section. Comparisons between different methods based on numerical simulations are provided in Section V.

A. All Pseudo Injection Placement (API)

One straightforward way to ensure area observability is to blindly assign pseudo injections to all the external buses of this area whose original injections, if they exist, have to be removed. The values and weights of the pseudo injections need to be assigned carefully. Using the forecasted loads may improve the quality of state estimation solutions. The weights should not be larger than the smallest weight used for all actual measurements. Though the smaller the better, excessively small weights may increase the singularity level of the gain matrix in state estimation, thus leading to ill-conditioning problem. Numerical simulations are provided in Section V to evaluate the impact of different pseudo weights.

Since the introduced pseudo injections are not all critical, the states estimated by first level may have different level of biases depending on the number and assigned weights of pseudo injections. In practice, considering the measurement noise, the impact of pseudo injections can be ignored when their weights are relatively small. Also note that the states of all external buses estimated in first level are used as inputs to the second level, with low weights.

B. Critical Pseudo Injection Placement

Exploiting the property that critical measurements do not spread measurement errors [27], one can strategically introduce only critical pseudo injections to ensure observability. The algorithm is briefly outlined below and more detailed description of numerical observability restoration method can be found in [17], [28].

Step 1: Construct real power measurement Jacobian matrix H and corresponding gain matrix $G=H^T H$.

Step 2: Apply Cholesky factorization to G and find first zero pivot during factorization.

Step 3: Add a pseudo injection at the bus corresponding to the zero pivot. A zero value with an arbitrary weight (preferably very small) is used for the pseudo measurement.

Step 4: Repeat Steps 2 and 3 until no more zero pivots are encountered and factorization is completed.

The above algorithm uses the P-θ observability, which considers the decoupled linearized measurement model. It assumes that real (P) and reactive (Q) measurements are paired. Note that the pseudo injections to be added in Step 3 are also added in pairs. By introducing pseudo injections following the above procedure, the resulting system is barely observable where all pseudo injections are critical in sense of P-θ observability. Such scheme is denoted as critical pseudo injection placement considering decoupled model observability (CPID).

When considering complete measurement model, the assigned pseudo injections following CPID may no longer be critical due to the coupled real and reactive power model. To consider the full model observability, one can construct Jacobian matrix using all measurements instead of only real ones in Step 1. For Step 3, a real or reactive pseudo injection is added one at a time. Usually, critical pseudo injection placement considering full model observability (CPIF) requires less or equal number of pseudo injections than CPID.

A similar method has been presented in [3]. It avoids adding pseudo injections instead of manipulating the decomposition of the gain matrix. When the inverse of gain matrix is required for the WLS estimation, an incomplete Cholesky factorization is carried out to deal with the zero pivots. However, the complexity of matrix factorization is $N^3$ where N is the size of the matrix. Thus, such scheme is computationally expensive when the system size is relatively large. CPID and CPIF also suffer from the computational burden as discussed above. However, if the network measurements and topology do not change, the set of critical pseudo injections is fixed and can be determined only once off-line.

C. Area Boundary Manipulation to Reduce Pseudo Injections (ABM)

Some methods to assign pseudo injection measurements based on existing area partition are discussed above. It is also possible to manipulate the boundary topology of two neighboring areas to reduce the number of required pseudo measurements.

Before introducing the area manipulation algorithms, an important property of boundary observability is discussed first. Consider the boundary buses between areas 20 and 14 in FIG. 3 as an example. States of bus 3197 and bus 2967 are estimated in the first level state estimation for area 20 where injection measurements incident to these two buses are unusable and thus removed. Since there is a flow measurement along the tie-line 8808 to 3197, this branch will still be observable and state of bus 3197 can be determined. However, this will not be the case for bus 2967 without any incident flow measurement. It is safe to say that, if the external bus of a partition of an observable system has an incident flow measurement, the state of this bus can be estimated.

Using the existing area definitions and proper manipulation, an optimized boundary topology can be obtained. The key idea is to find possible cut-sets containing branches with flow measurements. The following approaches can be used to modify the boundary between two neighboring areas:

Expansion (ABME): for each area, expand its external tier till most of branches incident to the buses in outermost tier have flow measurements.

Redefinition (ABMR): find a new boundary of two areas such that boundary branches contain more flow measurements.

The expansion scheme can be transformed into a minimum cut problem in optimization theory. One parameter M needs to be chosen in advance. It represents the number of external tiers outside the boundary tier whose buses are candidates for the expansion of the area. Furthermore, it limits the number of buses to be checked, as well as the size of expansion. Consequently, it avoids searching the new boundary exhaustively for the whole system, and terminates the search appropriately. As a payoff, the resulting area definition is not globally optimal, but the best within a limited number of external tiers. The steps of ABME algorithm for one area are given below:

Step 1: For an area i, the external tiers can be defined as:

$S_i^{ext:1}$ consists of the remote end buses of tie-lines incident to the area, i.e., buses that are directly connected to the boundary buses $S_i^b$ but not belong to area i. It is identical to the definition $S_i^{ext}$ in Section II-C.

$S_i^{ext:M}$ consists of the buses that are connected to the buses in $S_i^{ext:M-1}$ but not in $S_i^{ext:M-2}, \ldots S_i^{ext:1}$ and boundary tiers.

Set the default value of M to be 4.

Step 2: Introduce a pseudo source bus ps that it is directly connected to all boundary buses of area i. Also introduce a pseudo sink bus ps that it is connected to all the buses in $S_i^{ext:M}$. Branches connecting pseudo source or sink to other buses are denoted as pseudo branches. Then, construct an undirected graph G=(V, E) that V consists of pseudo source, $S_i^b$, $S_i^{ext:1}, \ldots, S_i^{ext:M-1}$, $S_i^{ext:M}$, and pseudo sink.

E consists of all the branches and pseudo branches incident to buses in V.

Step 3: Assign weights to all the branches. The weight of a branch from bus u to bus v, denoted as $c_{u,v}$, equals to $W_{pb}$ for pseudo branch;

$W_{wf}$ for the branch with flow measurement;

$W_{wof}$ for the other branches.

A typical choice of the weights is $W_{pb}=10000$, $W_{wf}=1$ and $W_{wof}=100$.

Step 4: Formulate the minimum cut problem from ps to pt. A cut C=(VS, VT) is a partition of V such that ps ∈VS and pt ∈VT The total weights of the branches that connect the source part VS to the sink part VT is defined as c(VS, VT)=$\Sigma_{(i,j)\in E} c_{i,j} d_{i,j}$ where $d_{i,j}=1$ if i∈VS and j ∈VT, and 0 otherwise. Therefore, the minimum cut problem can be formulated [29] as to minimize the total weights, shown in follows.

Minimize c(VS, VT)
subject to $$d_{u,v} - d_u + d_v \geq 0, (u,v) \in E$$

$$d_v + d_{ps,v} \geq 0, (ps,v) \in E$$

$$-d_u + d_{u,pt} \geq 0, (u,pt) \in E$$

where $d_u = 1$ if $u \in V\,S$, and 0 otherwise.

Step 5: Use linear programming to solve the minimum cut problem. Solution consists of the branches whose removal will split the subsystem into two parts. These branches are also called minimum cut branches. Since the graph is connected and undirected, and the weights are positive and rational, such branches can always be found to split the graph. If there are multiple solutions with the same objectives, the one with the least number of buses in expansion is chosen.

Figure 5:
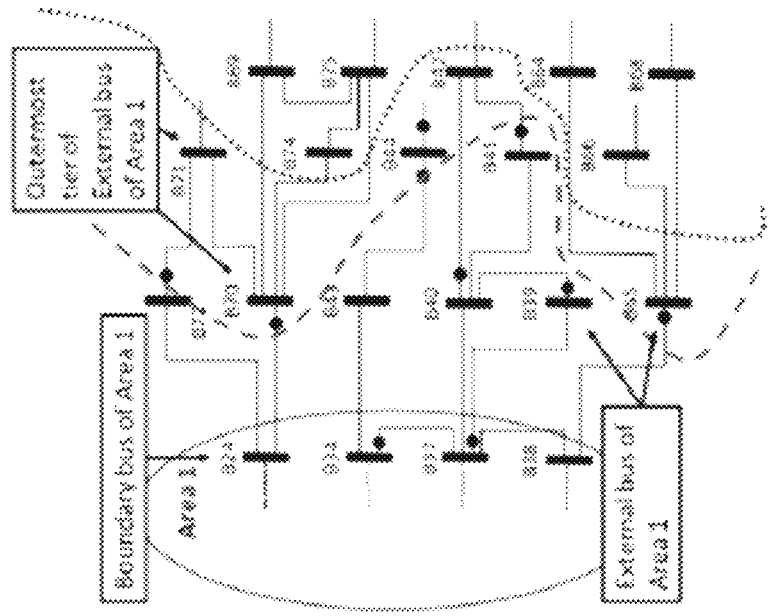
FIG. 5 illustrates the topology after expansion of an area to reduce pseudo injections in accordance with one or more embodiments.
Figure 4:
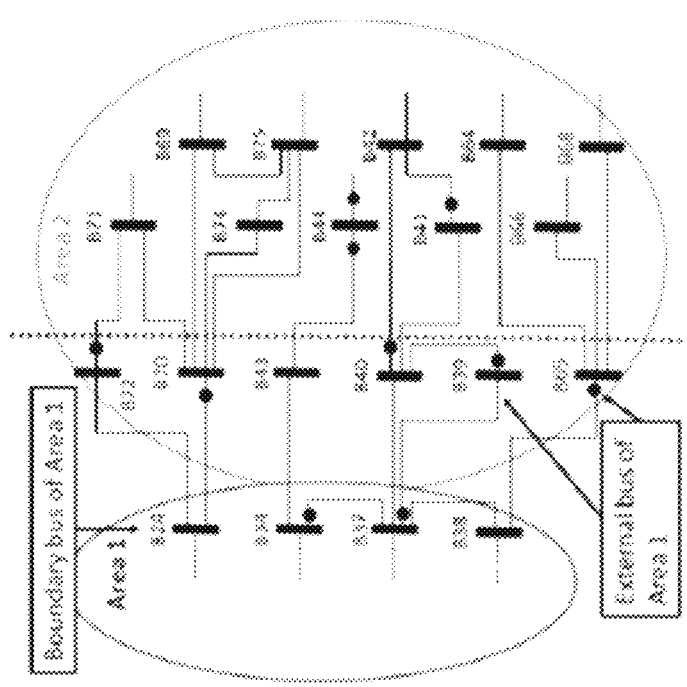
FIG. 4 illustrates an example of an original area topology.

By applying the above procedure to an area, minimum cut branches, all buses belonging to pseudo source side VS and sink side can be obtained. The buses of minimum cut branches in the sink side are defined as the new outermost external tier, denoted as $x_i^{ext:o}$. The definitions of internal and boundary buses of the area remain the same. All the other buses in the pseudo source side, along with $x_i^{ext:o}$, constitute the new external bus set, denoted by $x_i^{exo}$. An example of a subsystem is shown in FIG. 4. By manipulating the boundary and external buses of area 1, results of new area topology are given in FIG. 5. The minimum cut-set is highlighted in blue dashed line in FIG. 5. All the buses to the left of red dashed line and outside the original area 1 are external buses. A numerical validation of the proposed ABME method is provided in Section V-C.

For the area redefinition scheme (ABMR), which is to define a new boundary of two neighboring areas, it can set the new ABMR boundary according to the minimum cut-set branches obtained from ABME. For the subsystem in FIG. 5, the minimum cut-set branches can be chosen as the new boundary branches between the two areas. As a result, area 1 expands and area 2 shrinks. This procedure can be repeated for all areas in the system, resulting an area definition whose boundary branches have more flow measurements. However, for second level state estimation, ABME has more overlapped buses whose states are estimated twice, improving the quality of estimates. Results of ABME are discussed in the simulation section.

V. Case Study and Simulations

A. Procedure of Two-level State Estimation

Figure 7:
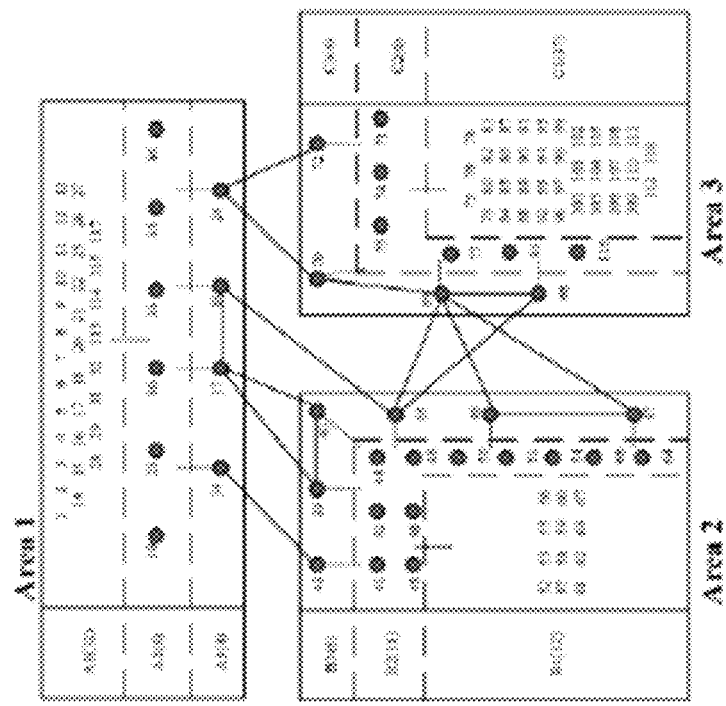
FIG. 7 illustrates an example of a second level state estimation on the IEEE 118 bus system in accordance with one or more embodiments.
Figure 6:
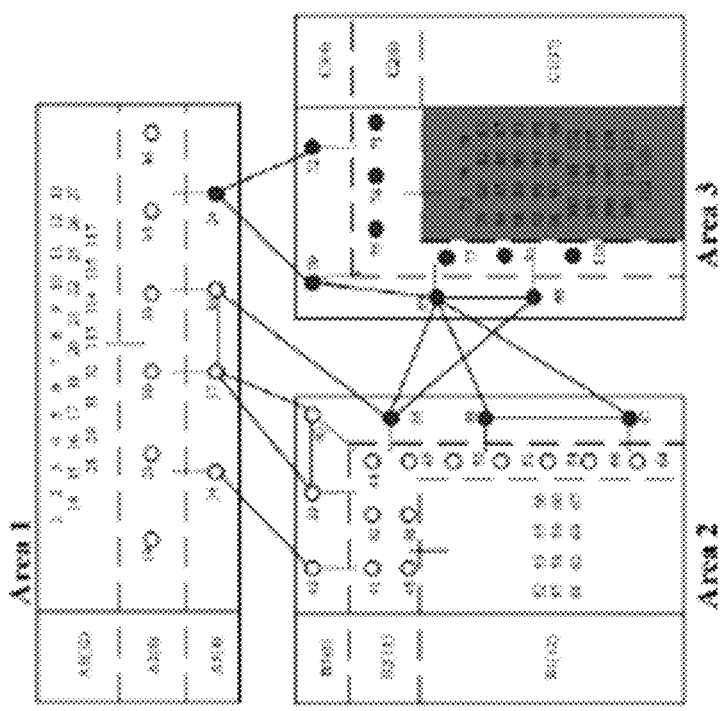
FIG. 6 illustrates an example of first level state estimation on an IEEE 118 bus system in accordance with one or more embodiments.

The two-level state estimation is implemented and tested using the IEEE 118 bus system. The system is partitioned into three interconnected areas. The first level estimation on area 3 provides the state estimates of red buses in FIG. 6. The states of boundary and external buses of all areas are synchronized by second level state estimation, as shown in FIG. 7, highlighted in blue circles.

B. Validation of ABME

A numerical comparison of the area boundary cut-set objectives with and without proposed ABME algorithm is provided in Table I (FIG. 10). The weights are the same as defined in Step 3, and $2 \times W_{pb}$ is subtracted from the objectives of the minimum cut-set. The objectives without proposed algorithm is calculated based on the original boundary branches and weights.

Results in Table I (FIG. 10) show that some of the areas have noticeable improvements. Observability of the areas where all minimum cut-set branches have flow measurements, is guaranteed. Thus, no pseudo injections are needed. For the rest of the areas, an observability check based on CPIF technique will still be needed, however the required number of critical pseudo injections is no more than that of CPIF only.

C. Comparison of Methods to Ensure Area Observability

Several different pseudo injection placement algorithms to ensure area observability, including all pseudo injection (API), critical pseudo injections considering decoupled model observability (CPID), critical pseudo injections considering full model observability (CPIF) and area boundary expansion (ABME) are discussed in Section IV. However, as described in Section IV-C, ABME expands the original area to a larger one by augmenting some neighboring buses. Therefore, there are more states to be estimated. To make a fair comparison, a modified metric ABME* is introduced and defined as the weighted squares of the measurement residuals corresponding to the original area.

Three scenarios are simulated:
  Area 3 of IEEE 118 bus system containing 51 buses. The weights of all actual measurements are chosen as $10^4$. Measurements are without any noise. Three different level of pseudo injection weights are provided to evaluate their impacts: $10^4$, 1 and $10^{-4}$. Estimation results of first level SE on area 3 are provided in Table II (FIG. 11).
  Area 3 of IEEE 118 bus system. White Gaussian noise with zero mean and variance $10^{-4}$ are added to all measurements. Three different pseudo weights are compared: $10^4$, 1 and $10^4$. Estimation results of first level SE on area 3 are provided in Table III (FIG. 12).
  Area 31 of an 17014 bus real world interconnected system containing 890 buses. The measurements are synthesized without any noise for better illustration of the comparison. The weights of measurements vary from 0.01 to 100, depending on the type of measurements. Three different pseudo weights are compared: $10^{-2}$, $10^{-5}$, and $10^{-8}$. Estimation results of first level SE on area 31 are provided in Table IV (FIG. 13).

Note that $N_{pi}$ stands for the number of pseudo injections to be assigned, and $w_p$ for the weight of pseudo injections. CtrlSE indicates the conventional centralized state estimation.

Figure 8:
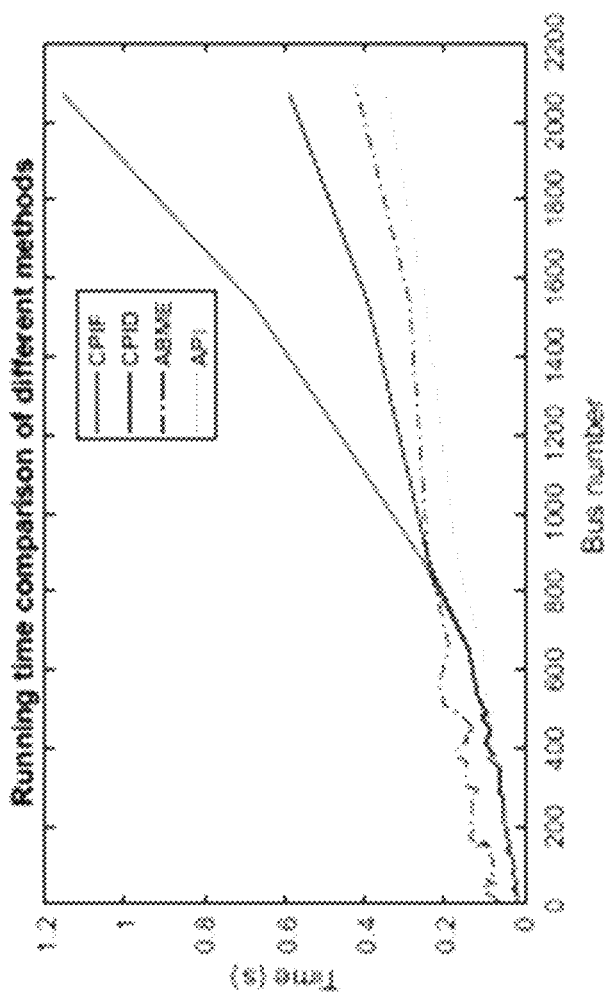
FIG. 8 is a graph illustrating an example of a running time comparison of different methods for ensuring area observability in accordance with one or more embodiments.

The average running time of different methods for several different areas are plotted in FIG. 8. Thus, the following conclusions can be drawn:
  When pseudo weights are large, the performance can be ranked as CPIF≈ABME>CPID>API.
  When pseudo weights are small, CPID, CPIF and ABME have similar performances and API's is slightly worse.
  Regarding computational efficiency, the following is always true: CPIF≥CPID>API. Comparing to CPIF and CPID, ABME requires more time to initialize when the size of the area is small, but comparatively much less with increasing area sizes, as verified by the results shown in Tables III and IV (FIGS. 12 and 13).

D. Computational Efficiency

All the simulations were conducted on a desktop computer with Intel® Core™ i7-4790 3.60 GHz processor and 8 GB memory. The computational efficiency is evaluated by averaging the results of 100 executions of centralized state estimation (CtrlSE) and the proposed two-level state estimation (2LvSE) for the 17014 bus system. Both state estimators were initialized at flat start. Results are listed in Table V (FIG. 14).

Since the static state estimators are commonly executed every 30 seconds or longer, all the presented methods can readily be implemented online using a high end fast processor. Also, note that the CPU time required by 2LvSE-API method is even less than that of the centralized state estimator. On the flip side, its estimation accuracy is lowest as discussed earlier. Thus, a recommendation for practical implementation would be 2LvSE-ABME≥2LvSE-API>2LvSE-CPID≈2LvSE-CPIF.

E. Management of Divergent Cases by the Proposed Approach

The following procedure can be implemented to test the performance of the multi-area approach under divergent conditions:

Step 1: read and parse network data and measurement files;

Step 2: introduce a severe error in a measurement or network topology;

Step 3: solve centralized state estimation (CtrlSE) for the entire system, if it diverges, continue;

Step 4: parse every zone and apply area modification algorithm, apply appropriate algorithm to ensure area observability;

Step 5: execute two-level state estimation (2LvSE).

Simulations are carried out on IEEE 118 bus system and a utility system with 17,014 buses, 22,132 branches, 71,282 measurements and 51 zones. Several scenarios are simulated and tested. The measurements are synthesized and white Gaussian noise with variance $10^6$ are introduced. For the WLS technique, the convergence tolerance is $10^{-4}$, iteration limit is 10 and it is initialized with flat start, i.e., voltage states equal to 1 and angles are 0.

In the following tables, Position indicates the bus location within an area. 'Vm' and 'Va' stand for the estimated voltage magnitude and phase angle respectively. The 'actual' values represent the power flow solutions, i.e., true states. The centralized state estimator diverges for all the following simulation scenarios. Results that can not be obtained are marked by 'NA'. 2LvSE-ABME scheme is used in the following simulations. For comparison purpose, the actual states are provided in the following tables as well.

1) IEEE 118 bus System: Case A: A gross error is introduced to real power injection measurement at bus 54 in area 2. Results in Table VI (FIG. 15) indicate that area 2 is isolated by two-level state estimator. Note that the boundary bus of area 2 can still be estimated by neighboring areas in the first level estimation.

Case B: A topology error is simulated by ignoring a breaker status change at bus 110 in area 3. Consequently, the centralized state estimator diverges. Note that the Trust Region (TR) method can be used to handle such divergent cases as described in [1]. For purposes of comparison, solutions obtained by TR method are also provided in Table VII (FIG. 16).

Table VI (FIG. 15) shows that globally convergent TR method pro-vides a converged but largely biased estimation of the states. Meanwhile, 2LvSE provides high quality state estimates for part of the system, isolating the area containing the errors. Besides, the TR method is extremely time consuming that can hardly be implemented for large scale systems. Thus in the following case studies, results of TR are not provided.

2) Large-Scale Interconnected System: Case C: A single gross error is introduced in real power flow measurement on branch 9408-8547. This branch is a tie-line connecting areas 20 and 22. Results in Table VIII (FIG. 17) show that first level SEs for both areas 20 and 22 diverge and both areas are isolated by 2LvSE.

Figure 9:
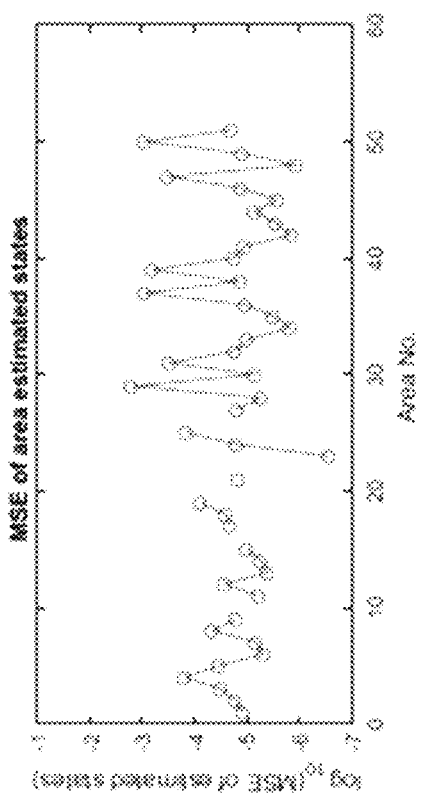
FIG. 9 is a graph illustrating an example of mean squared error (MSE) of estimated states with respect to their actual values for areas in accordance with one or more embodiments.

The mean squared error (MSE) of estimated states with respect to their actual values for all areas are plotted in FIG. 9. Note that three areas are empty and state estimates of area 20 and 22 are not available. It verifies the accuracy of the first level state estimation that the MSE values are all smaller than 0.01. Besides, the MSE for the estimates of CtrlSE is 0.0046.

Case D: A topology error in area 43 is simulated where the line 14591-14621 is incorrectly assumed to be out of service even though it is actually connected, as depicted in Table IX (FIG. 18).

Due to limited space, results of only four scenarios are provided. As evident from the given results, the proposed two-level state estimator successfully isolates the divergent area and provides accurate state estimates for the rest of system.

VI. Conclusions

A two-level state estimation approach is used in order to address a very common problem in wide-area state FIG. 9. MSE of estimated states for all areas estimation, namely complete failure of the state estimator to converge. The proposed approach is shown to effectively isolate the sub-system containing the cause of divergence, hence enabling the estimator to provide accurate estimates for the remaining parts of the system. Performance of the method is verified by numerical experiments carried out using the IEEE 118 bus and a 17000-bus large utility system. The proposed two-level multi-area state estimator can provide solutions for the largest solvable part of the system and isolate those areas that are impacted by the factors causing divergence of the existing centralized estimators.

Figure 19:
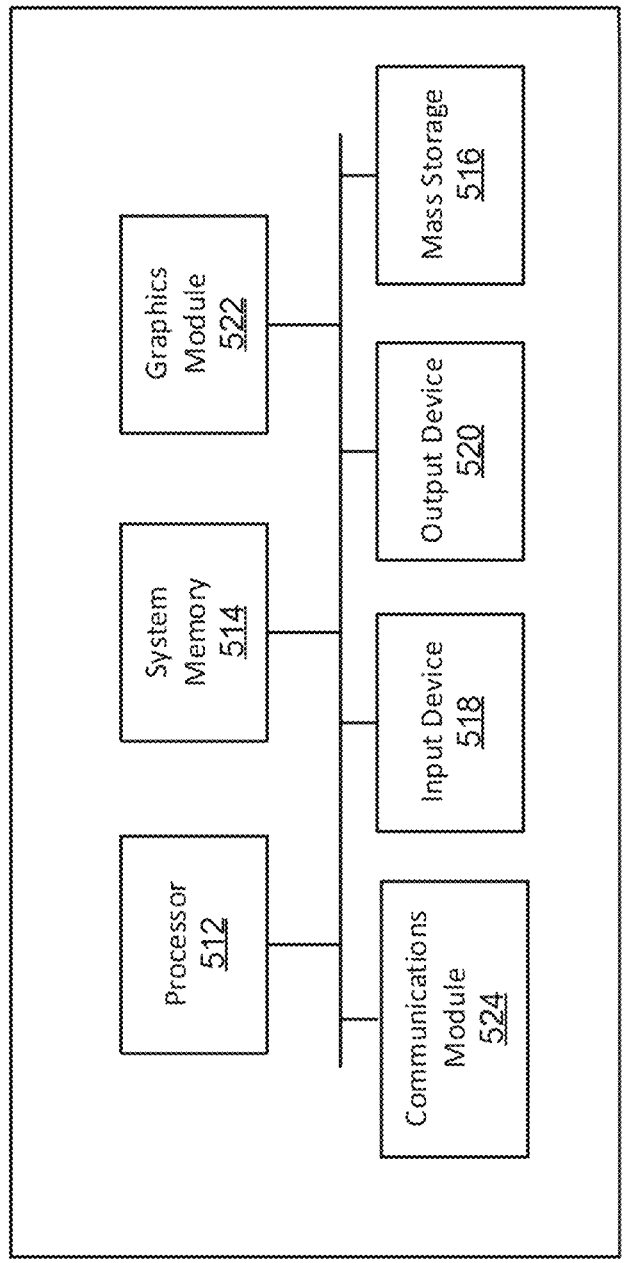
FIG. 19 is a simplified block diagram illustrating an exemplary computer system in which various processes described herein may be implemented.

The methods, operations, modules, and systems described herein for two-level state estimation may be implemented in one or more computer programs executing on a programmable computer system. FIG. 19 is a simplified block diagram illustrating an exemplary computer system, on which the one or more computer programs may operate as a set of computer instructions. The computer system includes, among other things, at least one computer processor 512, system memory 514 (including a random access memory and a read-only memory) readable by the processor 512. The computer system also includes a mass storage device 516 (e.g., a hard disk drive, a solid-state storage device, an optical disk device, etc.). The computer processor 512 is capable of processing instructions stored in the system memory or mass storage device. The computer system additionally includes input/output devices 518, 520 (e.g., a display, keyboard, pointer device, etc.), a graphics module 522 for generating graphical objects, and a communication module or network interface 524, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

REFERENCES

[1] S. Pajic and K. A. Clements, "Power system state estimation via globally convergent methods," IEEE Trans. Power Syst., vol. 20, no. 4, pp. 1683-1689, November 2005.
[2] T. V. Cutsem, J. L. Horward, and M. Ribbens-Pavella, "A two-level static state estimator for electric power systems," IEEE Trans. Power App. Syst., vol. PAS-100, no. 8, pp. 3722-3732, August 1981. [3] L. Zhao and A. Abur, "Multi area state estimation using synchronized phasor measurements," IEEE Trans. Power Syst., vol. 20, no. 2, pp. 611-617, May 2005.
[4] P. Ren and A. Abur, "Obtaining partial solutions for divergent state estimation problems in large power systems," in Proc. Int. Symp. Circuits Syst., May 2018, pp. 1-5.
[5] K. A. Clements, O. J. Denison, and R. J. Ringlee, "A multi-area approach to state estimation in power system networks," in Proc. IEEE PES Summer Meeting, Paper C72 465-3, San Francisco, July 1972.
[6] A. Gómez-Expósito, A. V. Jaen, C. Gómez-Quiles, P. Rousseaux, and T. V. Cutsem, "A taxonomy of multi-area state estimation methods," Elect. Power Syst. Res., vol. 26, no. 3, pp. 1209-1220, August 2011.
[7] T. Yang, H. Sun, and A. Bose, "Transition to a two-level linear state estimator part i: Architecture," IEEE Trans. Power Syst., vol. 26, no. 1, pp. 46-53, February 2011.
[8] L. Xie, D. Choi, S. Kar, and H. V. Poor, "Fully distributed state estimation for wide-area monitoring systems," IEEE Trans. Smart Grid, vol. 3, no. 3, pp. 1154-1169, September 2012.
[9] V. Kekatos and G. B. Giannakis, "Distributed robust power system state estimation," IEEE Trans. Power Syst., vol. 28, no. 2, pp. 1617-1626, May 2013.
[10] E. W. S. Angelos and E. N. Asada, "Improving state estimation with real-time external equivalents," IEEE Trans. Power Syst., vol. 31, no. 2, pp. 1289-1296, March 2016.
[11] E. Ghahremani and I. Kamwa, "Local and wide-area pmu-based decentralized dynamic state estimation in multi-machine power systems," IEEE Trans. Power Syst., vol. 31, no. 1, pp. 547-562, January 2016.
[12] T. Wu, C. Y. Chung, and I. Kamwa, "A fast state estimator for systems including limited number of pmus," IEEE Trans. Power Syst., vol. 32, no. 6, pp. 4329-4339, November 2017.
[13] W. Zheng, W. Wu, A. Gómez-Expósito, B. Zhang, and Y. Guo, "Distributed robust bilinear state estimation for power systems with nonlinear measurements," IEEE Trans. Power Syst., vol. 32, no. 1, pp. 499-509, January 2017.
[14] J. Kang and D. Choi, "Distributed multi-area wls state estimation integrating measurements weight update," IET Gener., Trans. Distri., vol. 11, no. 10, pp. 2552-2561, 2017.
[15] A. Minot, Y. M. Lu, and N. Li, "A distributed gauss-newton method for power system state estimation," IEEE Trans. Power Syst., vol. 31, no. 5, pp. 3804-3815, September 2016.
[16] Y. Guo, L. Tong, W. Wu, H. Sun, and B. Zhang, "Hierarchical multi-area state estimation via sensitivity function exchanges," IEEE Trans. Power Syst., vol. 32, no. 1, pp. 442-453, January 2017.
[17] A. Abur and A. Gómez-Expósito, Power Systems State Estimation: Theory and Implementation. New York: Marcel Dekker, 2004.
[18] F. Zhao, E. Litvinov, and T. Zheng, "A marginal equivalent decomposition method and its application to multi-area optimal power flow problems," IEEE Trans. Power Syst., vol. 29, no. 1, pp. 53-61, January 2014.
[19] W. Lu, M. Liu, S. Lin, and L. Li, "Fully decentralized optimal power flow of multi-area interconnected power systems based on distributed interior point method," IEEE Trans. Power Syst., vol. 33, no. 1, pp. 901-910, January 2018.
[20] I. Blanco and J. M. Morales, "An efficient robust solution to the two-stage stochastic unit commitment problem," IEEE Trans. Power Syst., vol. 32, no. 6, pp. 4477-4488, November 2017.
[21] I. Kamwa, A. K. Pradhan, G. Joos, and S. R. Samantaray, "Fuzzy partitioning of a real power system for dynamic vulnerability assessment," IEEE Trans. Power Syst., vol. 24, no. 3, pp. 1356-1365, August 2009.
[22] D. Osipov and K. Sun, "Adaptive nonlinear model reduction for fast power system simulation," IEEE Trans. Power Syst., pp. 1-1, 2018.
[23] B. W. Kernighan and S. Lin, "An efficient heuristic procedure for partitioning graphs," Bell System Technical Journal, vol. 49, no. 2, pp. 291-307, February 1970.
[24] C. M. Fiduccia and R. M. Mattheyses, "A linear-time heuristic for improving network partitions." IEEE Publishing, 1982, pp. 175-181.
[25] J. Chlebkov, "Approximating the maximally balanced connected partition problem in graphs," Inform. Process. Letters, vol. 60, no. 5, pp. 225-230, 1996.
[26] B. Djuric, J. Kratica, D. Tosic, and V. Filipovic, "Solving the maximally balanced connected partition problem in graphs by using genetic algorithm," Computing and Informatics, vol. 27, no. 3, pp. 341-354, 2008.
[27] P. Ren and A. Abur, "Modification of boundary zone measurements to avoid spreading of errors," in Proc. 2015 IEEE Eindhoven PowerTech, June 2015, pp. 1-6.
[28] G. N. Korres and P. J. Katsikas, "A hybrid method for observability analysis using a reduced network graph theory," IEEE Trans. Power Syst., vol. 18, no. 1, pp. 295-304, February 2003.
[29] M. Stoer and F. Wagner, "A simple min-cut algorithm," J. ACM, vol. 44, no. 4, pp. 585-591, July 1997.

The invention claimed is:

1. A computer-implemented method for state estimation for a multi-area power grid, comprising the steps of:
   (a) partitioning the multi-area power grid into a plurality of interconnected areas based on a given set of partitioning criteria, each of said areas having one or more substations;
   (b) using an individual area state estimator for each of said plurality of areas to attempt to independently calculate an individual area solution of a state of each area based on measurement data received from sensors in the one or more substations in the area;
   (c) when an individual area solution cannot be obtained for a given area because the individual area state estimator for the given area fails to converge, partitioning the given area into a plurality of interconnected sub-areas based on a given set of criteria, and attempting to independently calculate an individual area solution of a state of each sub-area based on measurement data received from sensors in the one or more substations in the sub-area, and isolating any sub-area for which an individual area solution cannot be obtained;
   (d) combining the individual area solutions for said plurality of areas obtained in (b) and the plurality of sub-areas obtained in (c) to determine a solution for a state of the multi-area power grid; and
   (e) outputting the solution for a state of the multi-area power grid.

2. The method of claim 1, wherein (e) comprises outputting the state of the multi-area power grid to a control center to control operation of the multi-area power grid based on the state of the multi-area power grid.

3. The method of claim 1, wherein the measurement data includes at least one bus voltage magnitude per area and power flow and injection measurements data.

4. The method of claim 1, wherein combining individual area solutions for said plurality of areas and sub-areas comprises synchronizing individual area reference angles and detecting and removing errors in the individual area solutions.

5. The method of claim 1, wherein the multi-area power grid is partitioned into the plurality of interconnected areas and sub-areas while maintaining observability of each of said plurality of areas and sub-areas.

6. The method of claim 1, wherein partitioning includes performing a network observability analysis and applying a pseudo power injection to buses in any area and sub-area having a loss of observability to improve area observability.

7. The method of claim 1, wherein the multi-area power grid is partitioned into a plurality of areas and sub-areas interconnected by tie-lines connecting buses of different areas.

8. The method of claim 1, further comprising performing a Largest Normalized Residual Test in (b) and (c) to detect and remove bad data.

9. A computer system, comprising:
   at least one processor;
   memory associated with the at least one processor; and
   a program supported in the memory for state estimation for a multi-area power grid, the program containing a plurality of instructions which, when executed by the at least one processor, cause the at least one processor to:
   (a) partition the multi-area power grid into a plurality of interconnected areas based on a given set of partitioning criteria, each of said areas having one or more substations;
   (b) use an individual area state estimator for each of said plurality of areas to attempt to independently calculate an individual area solution of a state of each area based on measurement data received from sensors in the one or more substations in the area;
   (c) when an individual area solution cannot be obtained for a given area because the individual area state estimator for the given area fails to converge, partition the given area into a plurality of interconnected sub-areas based on a given set of criteria, and attempt to independently calculate an individual area solution of a state of each sub-area based on measurement data received from sensors in the one or more substations in the sub-area, and isolate any sub-area for which an individual area solution cannot be obtained;
   (d) combine the individual area solutions for said plurality of areas obtained in (b) and the plurality of sub-areas obtained in (c) to determine a solution for a state of the multi-area power grid; and
   (e) output the solution for a state of the multi-area power grid.

10. The computer system of claim 9, wherein (e) comprises outputting the state of the multi-area power grid to a control center to control operation of the multi-area power grid based on the state of the multi-area power grid.

11. The computer system of claim 9, wherein the measurement data includes at least one bus voltage magnitude per area and power flow and injection measurements data.

12. The computer system of claim 9, wherein combining individual area solutions for said plurality of areas and sub-areas comprises synchronizing individual area reference angles and detecting and removing errors in the individual area solutions.

13. The computer system of claim 9, wherein the multi-area power grid is partitioned into the plurality of interconnected areas and sub-areas while maintaining observability of each of said plurality of areas and sub-areas.

14. The computer system of claim 9, wherein (a) includes performing a network observability analysis and applying a pseudo power injection to buses in any area and sub-area having a loss of observability to improve area observability.

15. The computer system of claim 9, wherein the multi-area power grid is partitioned into a plurality of areas and sub-areas interconnected by tie-lines connecting buses of different areas.

16. The computer system of claim 9, further comprising instructions for performing a Largest Normalized Residual Test in (b) and (c) to detect and remove bad data.

17. A computer program product residing on a non-transitory computer readable medium having a plurality of instructions stored thereon for state estimation for a multi-area power grid which, when executed by a computer processor, cause that computer processor to:
   (a) partition the multi-area power grid into a plurality of interconnected areas based on a given set of partitioning criteria, each of said areas having one or more substations;
   (b) use an individual area state estimator for each of said plurality of areas to attempt to independently calculate an individual area solution of a state of each area based on measurement data received from sensors in the one or more substations in the area;
   (c) when an individual area solution cannot be obtained for a given area because the individual area state estimator for the given area fails to converge, partition the given area into a plurality of interconnected sub-areas based on a given set of criteria, and attempt to independently calculate an individual area solution of a state of each sub-area based on measurement data received from sensors in the one or more substations in the sub-area, and isolate any sub-area for which an individual area solution cannot be obtained;

(d) combine the individual area solutions for said plurality of areas obtained in (b) and the plurality of sub-areas obtained in (c) to determine a solution for a state of the multi-area power grid; and (e) output the solution for a state of the multi-area power grid.

18. The computer program product of claim 17, wherein (e) comprises outputting the state of the multi-area power grid to a control center to control operation of the multi-area power grid based on the state of the multi-area power grid.

19. The computer program product of claim 17, wherein the measurement data includes at least one bus voltage magnitude per area and power flow and injection measurements data.

20. The computer program product of claim 17, wherein combining individual area solutions for said plurality of areas and sub-areas comprises synchronizing individual area reference angles and detecting and removing errors in the individual area solutions.

* * * * *